US012036981B2

(12) United States Patent
Weston et al.

(10) Patent No.: US 12,036,981 B2
(45) Date of Patent: Jul. 16, 2024

(54) SYSTEMS AND METHODS TO PROTECT A SIDE-VIEW MIRROR OF A VEHICLE

(71) Applicant: Ford Global Technologies, LLC, Dearborn, MI (US)

(72) Inventors: Keith Weston, Canton, MI (US); Andrew Denis Lewandowski, Sterling Heights, MI (US); Jordan Barrett, Milford, MI (US); Brendan Diamond, Grosse Pointe, MI (US); Michael Alan Mcnees, Flat Rock, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 361 days.

(21) Appl. No.: 17/529,140

(22) Filed: Nov. 17, 2021

(65) Prior Publication Data

US 2023/0150490 A1     May 18, 2023

(51) Int. Cl.
*B60W 30/00*     (2006.01)
*B60R 1/06*       (2006.01)
(Continued)

(52) U.S. Cl.
CPC ........... *B60W 30/0956* (2013.01); *B60R 1/06* (2013.01); *B60R 1/12* (2013.01); *B60W 30/09* (2013.01);
(Continued)

(58) Field of Classification Search
CPC .. B60W 30/0956; B60W 30/09; B60W 40/12; B60W 50/14; B60W 2050/0054;
(Continued)

(56) References Cited

U.S. PATENT DOCUMENTS 6,204,753 B1 *  3/2001  Schenk ................. B60R 1/0625
                                                340/932.2

FOREIGN PATENT DOCUMENTS

DE         19906667 A1    9/2000
DE     202005006903 U1    8/2006
(Continued)

OTHER PUBLICATIONS

Multi-sensing system with rear camera, Nissan Motor Corporation, Nissan Global, Oct. 4, 2021, 1-7.

*Primary Examiner* — Tiffany P Ohman
(74) *Attorney, Agent, or Firm* — Frank Lollo; Eversheds Sutherland (US) LLP (57) ABSTRACT

The disclosure generally pertains to systems and methods to protect a side-view mirror of a vehicle. An example method executed by a processor includes obtaining a first dimensional parameter associated with a body portion of a vehicle (for example, a width or a length of the vehicle) and a second dimensional parameter associated with a side-view mirror attached to the vehicle (for example, a protrusion distance of the side-view mirror). A turning path characteristic associated with a movement of the vehicle may then be determined, followed by determining a probability of a collision between the side-view mirror and an object located outside the vehicle. Determining the probability may be based on the first dimensional parameter, the second dimensional parameter, and the turning path characteristic. If the probability of the collision exceeds a threshold value, an alert may be issued, or a preventive maneuver executed in order to prevent the collision.

20 Claims, 9 Drawing Sheets

(51) Int. Cl.
*B60R 1/12* (2006.01)
*B60W 30/09* (2012.01)
*B60W 30/095* (2012.01)
*B60W 40/12* (2012.01)
*B60W 50/14* (2020.01)
*H04W 4/021* (2018.01)
*B60W 50/00* (2006.01)

(52) U.S. Cl.
CPC ............ *B60W 40/12* (2013.01); *B60W 50/14* (2013.01); *H04W 4/021* (2013.01); *B60R 2001/1215* (2013.01); *B60R 2300/8093* (2013.01); *B60W 2050/0054* (2013.01); *B60W 2050/146* (2013.01)

(58) Field of Classification Search
CPC ...... B60W 2050/146; B60R 1/06; B60R 1/12; B60R 2001/1215; B60R 2300/8093; H04W 4/021
USPC ......................................................... 701/301
See application file for complete search history.

(56) References Cited

FOREIGN PATENT DOCUMENTS

| | | | |
|---|---|---|---|
| JP | 2012192777 A | * | 10/2012 |
| WO | 2015010270 | | 1/2015 |

\* cited by examiner

SYSTEMS AND METHODS TO PROTECT A SIDE-VIEW MIRROR OF A VEHICLE

BACKGROUND

Many drivers have encountered a situation where a side-view mirror of a vehicle is damaged either due to contact between the vehicle and a stationary object (such as a doorframe of a garage) or a moving object (another vehicle). Some manufacturers have addressed this issue by providing side-view mirrors that fold automatically when the engine of the vehicle is turned off or can be manually folded by a driver upon exiting the vehicle. However, such solutions do not typically address certain types of situations that may arise when the vehicle is in motion.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

In terms of a general overview, certain embodiments described in this disclosure are directed to systems and methods for protecting a side-view mirror of a vehicle. An example method executed by a processor includes obtaining a first dimensional parameter and a second dimensional parameter. The first dimensional parameter is associated with a body portion of a vehicle and can be, for example, a width of the vehicle or a length of the vehicle. The second dimensional parameter is associated with a side-view mirror attached to the vehicle and can be, for example, a protrusion distance of the side-view mirror with respect to a body portion of the vehicle.

A turning path characteristic associated with a movement of the vehicle may then be determined. The turning path characteristic can be an arcuate motion path followed by the vehicle when maneuvering into a parking spot, for example. The arcuate motion path may increase a probability of a collision between the side-view mirror and an object located outside the vehicle. The probability of the collision may be determined based on the first dimensional parameter, the second dimensional parameter, and the turning path characteristic. If the probability of the collision exceeds a threshold value, an alert may be issued, or a preventive maneuver executed in order to prevent the collision. In an example embodiment, the alert is issued in the form of a graphical icon upon the side-view mirror of the vehicle. In another example embodiment, a geofence may be defined around an object (such as, for example, a garage of a residence) and used to avoid damaging a side-view mirror of one or more vehicles at various times.

ILLUSTRATIVE EMBODIMENTS

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the described example embodiments but should be defined only in accordance with the claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure.

Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, the word "vehicle" as used herein refers to any of various types of vehicles that include a side-view mirror. The various types of vehicles can not only include vehicles that are operated by drivers but also autonomous vehicles. The word "collision" as used herein should be understood to refer to any form of contact between two objects. One or both of the objects may be moving or one of the objects may be stationary at the moment of contact. It must also be understood that words such as "implementation," "scenario," "case," "instance," and "situation" as used herein are an abbreviated version of the phrase "In an example ("implementation," "scenario," "case," "approach," "instance," and "situation") in accordance with the disclosure." Furthermore, the word "example" as used herein is intended to be non-exclusionary and non-limiting in nature.

Figure 1:
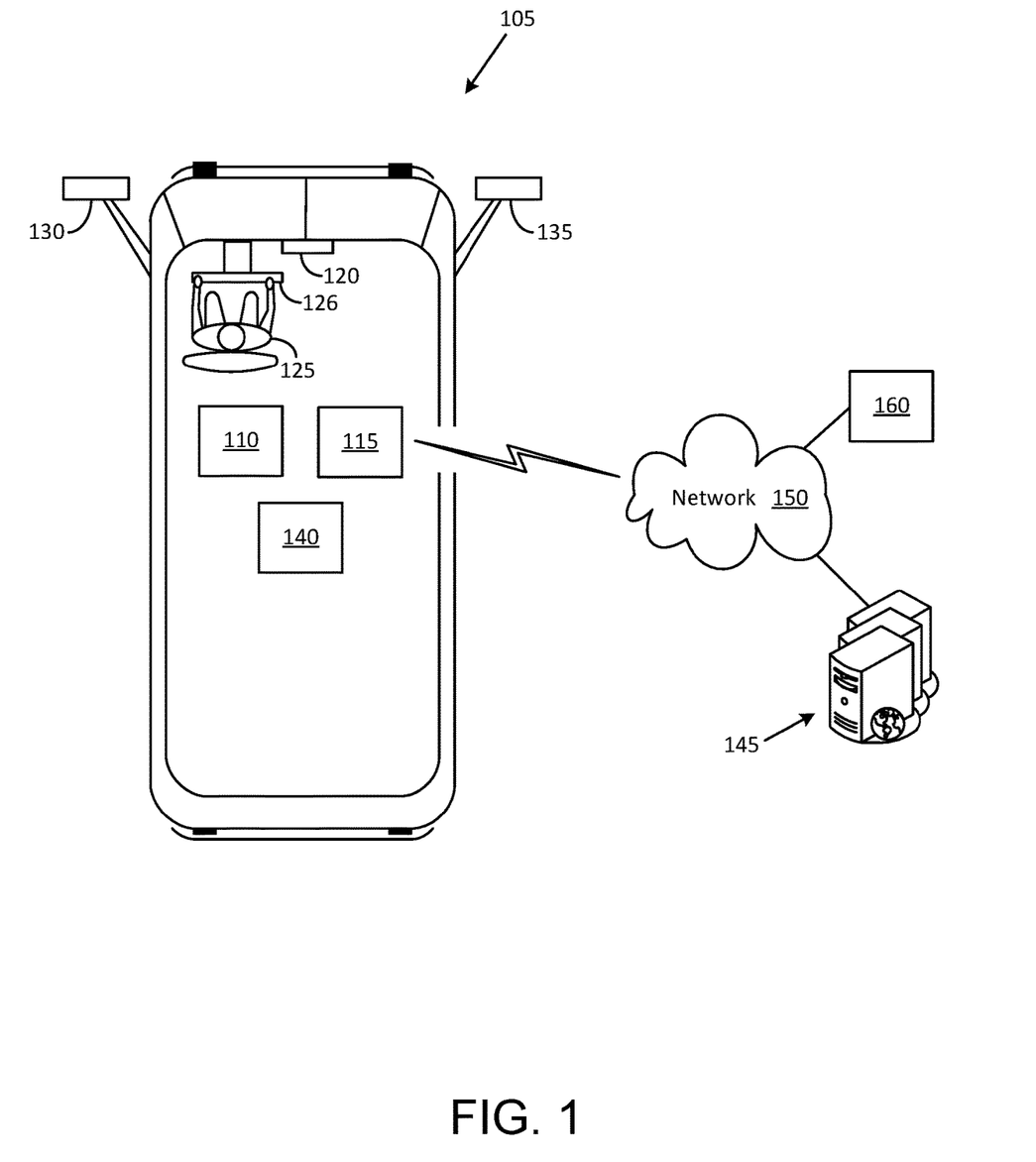
FIG. 1 illustrates an example vehicle that includes a side-view mirror protection system in accordance with an embodiment of the disclosure.

FIG. 1 illustrates an example vehicle 105 that includes a side-view mirror protection system 115 in accordance with an embodiment of the disclosure. The vehicle 105 may be any of various types of vehicles such as, for example, a gasoline powered vehicle, an electric vehicle, a hybrid electric vehicle, an autonomous vehicle, a sedan, a van, a minivan, a sports utility vehicle, a truck, a station wagon, a bus, an off-road vehicle, a semi-tractor trailer (an 18-wheeler), or a recreational vehicle (RV). In the illustrated scenario, the vehicle 105 is operated by a driver 125. However, in another scenario, the vehicle 105 can be an autonomous vehicle and the description provided herein with respect to the driver 125 is equally applicable to a computer system that controls the autonomous vehicle.

Furthermore, the vehicle 105 shown in the illustration is a large vehicle that includes two side-view mirrors (such as, for example, a bus, a recreational vehicle, a delivery van, or a truck). In other scenarios, the vehicle 105 can be a smaller vehicle such as, for example, a sedan, a golf-cart, or a three-wheeled vehicle.

The two side-view mirrors include a side-view mirror 130 provided on a driver side of the vehicle 105 and a side-view mirror 135 provided on a passenger side of the vehicle 105. Each of the side-view mirror 130 and the side-view mirror 135 is attached to a mounting assembly that is attached to the body of the vehicle 105. The mounting assembly can include one or more longitudinal members that allow for positioning of the side-view mirrors at a desired height above the ground and protruding away from a side of the vehicle 105. The extent of the protrusion may be defined in some cases by the nature of the vehicle 105. For example, where the vehicle 105 is a semi-tractor trailer, each of the side-view mirror 130 and the side-view mirror 135 may protrude significantly more than those provided in a sedan in order to enable the driver 125 to observe another vehicle that may be tailgating the semi-tractor trailer.

More specifically, the driver 125 can use the side-view mirror 130 to observe objects (vehicles, pedestrians, building structures, etc.) on the driver side of the vehicle 105 when the vehicle 105 is either stopped or is in motion. The driver 125 can similarly use the side-view mirror 135 to observe objects (vehicles, pedestrians, building structures, etc.) on the passenger side of the vehicle 105 when the vehicle 105 is either stopped or is in motion. More particularly, the driver 125 can use the side-view mirror 130 and/or the side-view mirror 135 to detect objects when performing actions such as, for example, changing lanes on a multi-lane highway, making a turn, and/or pulling into a parking spot (either by moving forward or by moving in reverse).

The description below may refer in large part to the side-view mirror 130, but it must be understood that the description is equally applicable to the side-view mirror 135. Consequently, for example, a description provided herein with respect to the side-view mirror 130 when the vehicle 105 is making a turn in one direction is equally pertinent to the side-view mirror 135 when the vehicle 105 is making a turn in the same direction and/or in an opposite direction.

The vehicle 105 can include various components, such as, for example, the side-view mirror protection system 115, a vehicle computer 110, an infotainment system 120, and a sensor system 140. These components that are illustrated as functional blocks can be mounted at various locations in the vehicle 105. Thus, for example, the side-view mirror protection system 115 may be located in an engine compartment, a glove compartment, or a trunk of the vehicle 105. The vehicle computer 110 may be located in an engine compartment of the vehicle 105. The infotainment system 120 may be located in a dashboard of the vehicle 105. The sensor system 140 can include various sensors mounted upon various components of the vehicle 105 (steering wheel, brake, accelerator, wheel, etc.).

The vehicle computer 110 may perform various operations associated with the vehicle 105, such as controlling engine operations (fuel injection, speed control, emissions control, braking, etc.), managing climate controls (air conditioning, heating etc.), activating airbags, and issuing warnings (check engine light, bulb failure, low tire pressure, etc.).

The infotainment system 120 can include elements such as, for example, a radio, an MP3 player, a global positioning system (GPS) device, a clock, and a display screen. The infotainment system 120 can further include a graphical user interface (GUI) or a human machine interface (HMI) that is displayed on the display screen. The GUI or HMI accepts input from an occupant of the vehicle 105 (the driver 125, for example) and/or displays various items pertaining to the side-view mirror protection system 115. An example item that may be displayed on the display screen of the infotainment system 120 can be an alert to inform the driver 125 of a risk of damage to the side-view mirror 130 as a result of a potential collision with an object outside the vehicle 105. The alert may be followed by another item that may be displayed in the form of an advice to take preventive action to avoid the collision. The alert may also be issued in the form of an audio warning that is produced via a loudspeaker of the infotainment system 120 (a beep or a tone, for example).

The sensor system 140 can include one or more sensors configured to produce signals in response to various conditions. The signals may be conveyed to the side-view mirror protection system 115 for evaluation to identify and characterize various actions of the vehicle 105. Thus, for example, the sensor system 140 may include a gear shift sensor that provides to the side-view mirror protection system 115, a sensor signal that may be evaluated by the side-view mirror protection system 115 for identifying a direction of travel of the vehicle 105 (forward direction or reverse direction).

The sensor system 140 may also include a steering wheel position sensor that produces signals corresponding to various positions of the steering wheel 126. The various signals can include, for example, a first set of digital bits (a first hex word, for example) when the steering wheel 126 is rotated clockwise to a first position (15 degrees clockwise, for example), a second set of digital bits when the steering wheel 126 is rotated clockwise to a second position (45 degrees clockwise, for example), and a third set of digital bits when the steering wheel 126 is rotated counter-clockwise to a third position (15 degrees counter-clockwise, for example). The signals produced by the steering wheel position sensor may be conveyed to the side-view mirror protection system 115. The side-view mirror protection system 115 may evaluate the signals to identify an angle of movement of the vehicle 105.

More particularly in accordance with the disclosure, the side-view mirror protection system 115 may evaluate the sensor signals provided by the gear shift sensor and the steering wheel position sensor to determine a turning path characteristic that is associated with a movement of the vehicle 105. The turning path characteristic can be defined in an example scenario, by an arcuate motion path followed by the vehicle 105 when reversing into a parking spot.

The sensor system 140 can further include an object detector for detecting objects located outside the vehicle 105. The objects can include moving objects (a vehicle, a pedestrian, an animal, etc.) and/or stationary objects (a wall, a doorway, a sidewalk, a loading dock, etc.). A few example object detectors can include a radar detector, an ultrasonic detector, a sonar detector, an optical detector (a laser detector, for example), an infrared detector, and a camera. The side-view mirror protection system 115 may evaluate sensor signals provided by such sensors to determine a separation distance between the side-view mirror 130 and an object located outside the vehicle 105.

The sensor system 140 can further include a speed sensor, a brake sensor, and other such sensors that provide various types of information to the side-view mirror protection system 115 in accordance with the disclosure. For example, the side-view mirror protection system 115 may evaluate sensor signals provided by a gear shift sensor, a steering wheel position sensor, an object detector, and a speed sensor to determine a separation distance between the side-view mirror 130 and an object located outside the vehicle 105 and/or to determine a rate at which the separation distance is being reduced (or increased) as a result of a speed and a direction of travel of the vehicle 105.

As another example, the side-view mirror protection system 115 may evaluate images obtained from one or more cameras (that can be a part of the sensor system 140) to determine a separation distance between the side-view mirror 130 and an object located outside the vehicle 105 and/or to determine a rate at which the separation distance is being reduced (or increased) as a result of a speed and a direction of travel of the vehicle 105. The images can be provided to the side-view mirror protection system 115 in real time in some implementations (a video clip, a video stream, etc.).

In an example implementation, the side-view mirror protection system 115 is communicatively coupled to the sensor system 140, the vehicle computer 110, and the infotainment system 120 via a vehicle bus that uses a controller area network (CAN) bus protocol, a Media Oriented Systems Transport (MOST) bus protocol, and/or a CAN flexible data (CAN-FD) bus protocol. In another example implementation, the communications may be provided via wireless technologies such as Bluetooth®, Ultra-Wideband (UWB), cellular, Wi-Fi, Zigbee®, or near-field-communications (NFC).

In some applications, the vehicle computer 110 and the side-view mirror protection system 115 are configured to communicate via a network 150 with devices located outside the vehicle 105 such as, for example, a cloud storage device 160 and a computer 145 (a server computer, a cloud computer, etc.).

The network 150 may include any one, or a combination of networks, such as, for example, a local area network (LAN), a wide area network (WAN), a telephone network, a cellular network, a cable network, a wireless network, and/or private/public networks such as the Internet. The network 150 may support any of various communication technologies such as, for example, Wi-Fi, Wi-Fi direct, Ultra-Wideband (UBW), cellular, machine-to-machine communication, and/or man-to-machine communication.

Figure 2:
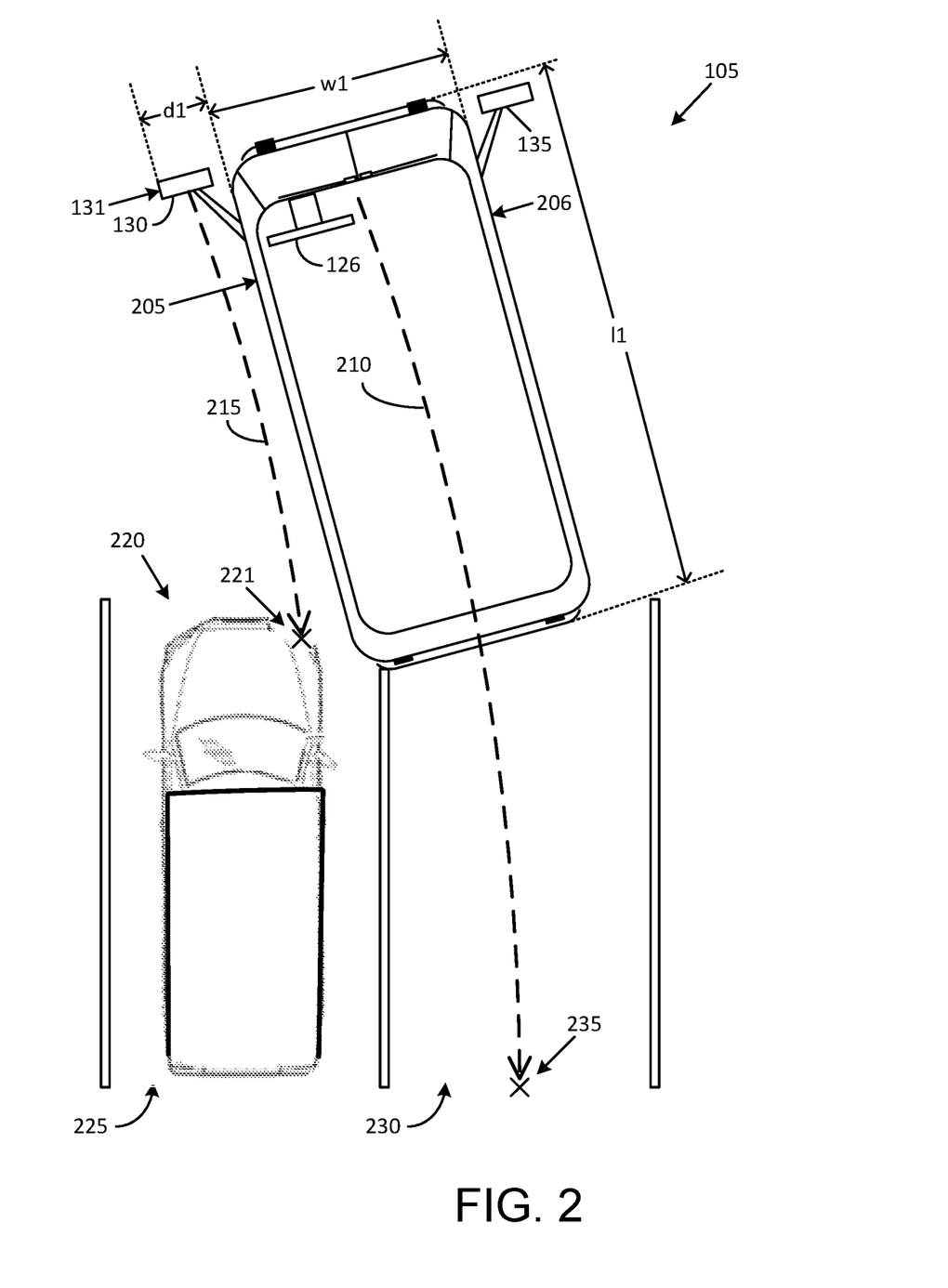
FIG. 2 illustrates a first example scenario in accordance with the disclosure where a vehicle having a protruding side-view mirror reverses into a parking spot.

FIG. 2 illustrates a first example scenario in accordance with the disclosure where the vehicle 105 reverses into a parking spot 230. Another vehicle 220 is parked in a parking spot 225 located adjacent to the parking spot 230. In this example scenario, the vehicle 105 has a width "w1" (measured along a transverse axis of the vehicle 105) and a length "l1" (measured along a longitudinal axis of the vehicle 105). The side-view mirror 130 protrudes outwards to an extent suited for use by the driver 125. More particularly, an outside edge 131 of the side-view mirror 130 extends over a protrusion distance "d1" with respect to a driver side 205 of the vehicle 105. The side-view mirror 135 similarly protrudes outwards from a passenger side 206 of the vehicle 105.

In the illustrated scenario, the turning path characteristic of the vehicle 105 may be defined by an arcuate motion path 210 having an end point 235 located inside the parking spot 230. The end point 235 can correspond to a rear end portion of the vehicle 105 when parked in the parking spot 230. The side-view mirror 130 follows an arcuate motion path 215 that runs parallel to the arcuate motion path 210.

The side-view mirror protection system 115 may evaluate sensor signals provided by the sensor system 140 (a gear shift sensor, a steering wheel position sensor, an object detector, a speed sensor, etc.) and/or images provided by a camera, to determine the turning path characteristic of the vehicle 105 and to determine a probability of a collision between the side-view mirror 130 and a portion of the vehicle 220. The probability of the collision may be determined based on various parameters such as, for example, a first dimensional parameter associated with a body portion of the vehicle 105, a second dimensional parameter associated with the side-view mirror 130, and the turning path characteristic of the vehicle 105.

The first dimensional parameter associated with the body portion of the vehicle 105 can be, for example, the width "w1" of the vehicle 105 and/or the length "l1" of the vehicle 105. The probability of the collision increases in direct proportion to the first dimensional parameter. For example, the probability of the collision increases in direct proportion to the width "w1" of the vehicle 105 (greater the width, higher the probability of the collision, and vice-versa).

In an example implementation, the side-view mirror protection system 115 is configured to obtain dimensional parameters of the vehicle 105 from sources such as, for example, a database of the server computer 145 and/or from the cloud storage device 160. The dimensional parameters may be stored in the database of the server computer 145 and/or the cloud storage device 160 by any of various entities such as, for example, a manufacturer of the vehicle 105 or a manager of operations associated with the vehicle 105 (a fleet manager of a rental car agency, for example). In some applications, the dimensional parameters may be stored in a database of the side-view mirror protection system 115.

The second dimensional parameter associated with the side-view mirror 130 can be, for example, the protrusion distance "d1" with respect to the driver side 205 of the vehicle 105. The probability of the collision increases in direct proportion to the second dimensional parameter. For example, the probability of the collision increases in direct proportion to the protrusion distance "d1" (greater the protrusion distance, higher the probability of the collision, and vice-versa). In an example implementation, the side-view mirror protection system 115 is configured to obtain data pertaining to the protrusion distance "d1" from sources such as, for example, a database of the side-view mirror protection system 115, a database of the server computer 145, and/or the cloud storage device 160.

The turning path characteristic (the arcuate motion path 210, for example) can be determined by the side-view mirror protection system 115 based on evaluating sensor signals and/or images in the manner described above. The probability of the collision increases in direct proportion to an angle of motion associated with the arcuate motion path 210 (sharper the angle of motion, higher the probability of the collision, and vice-versa).

In the illustrated scenario, the side-view mirror protection system 115 may determine a probability of collision between a reflecting surface of the side-view mirror 130 and an impact location 221 on the body of the vehicle 220. The probability of collision may then be compared to a threshold value that may be set by any of various entities such as, for example, the driver 125 of the vehicle 105, a manufacturer of the vehicle 105, or a manager. The side-view mirror protection system 115 may execute any of various operations when the probability of collision exceeds the threshold value.

In a first scenario, the side-view mirror protection system 115 issues an alert to warn the driver 125 of the probability of collision with the vehicle 220. The alert may be provided in various forms such as, for example in a graphical format on a reflective surface of the side-view mirror 130 (and/or on the display screen of the infotainment system 120) and/or in the form of an audible signal via a loudspeaker system in the vehicle 105.

In a second scenario, the side-view mirror protection system 115 executes a preventive maneuver to prevent the collision (or to minimize damage to the side-view mirror 130 in case the collision is unavoidable). The preventive maneuver is particularly relevant when the vehicle 105 is an autonomous vehicle. An example maneuver to prevent the collision can involve the side-view mirror protection system 115 communicating with the vehicle computer 110 and/or another control system in the vehicle 105 for executing a braking action that stops the vehicle 105 prior to the side-view mirror 130 coming in contact with the body of the vehicle 220.

Another example maneuver can involve the side-view mirror protection system 115 communicating with the vehicle computer 110 and/or another control system in the vehicle 105 for executing a change in direction of the vehicle 105 movement in a manner that prevents the side-view mirror 130 coming in contact with the body of the vehicle 220 (a veering action or a modification of a radius of the arcuate motion path 210).

Yet another example maneuver can involve the side-view mirror protection system 115 transmitting a signal to actuate a motor (not shown) provided in the mount assembly of the side-view mirror 130. Activation of the motor can cause the side-view mirror 130 to fold inwards towards the driver side 205 of the vehicle 105 prior to the side-view mirror reaching the impact location 221 on the vehicle 220.

Figure 3:
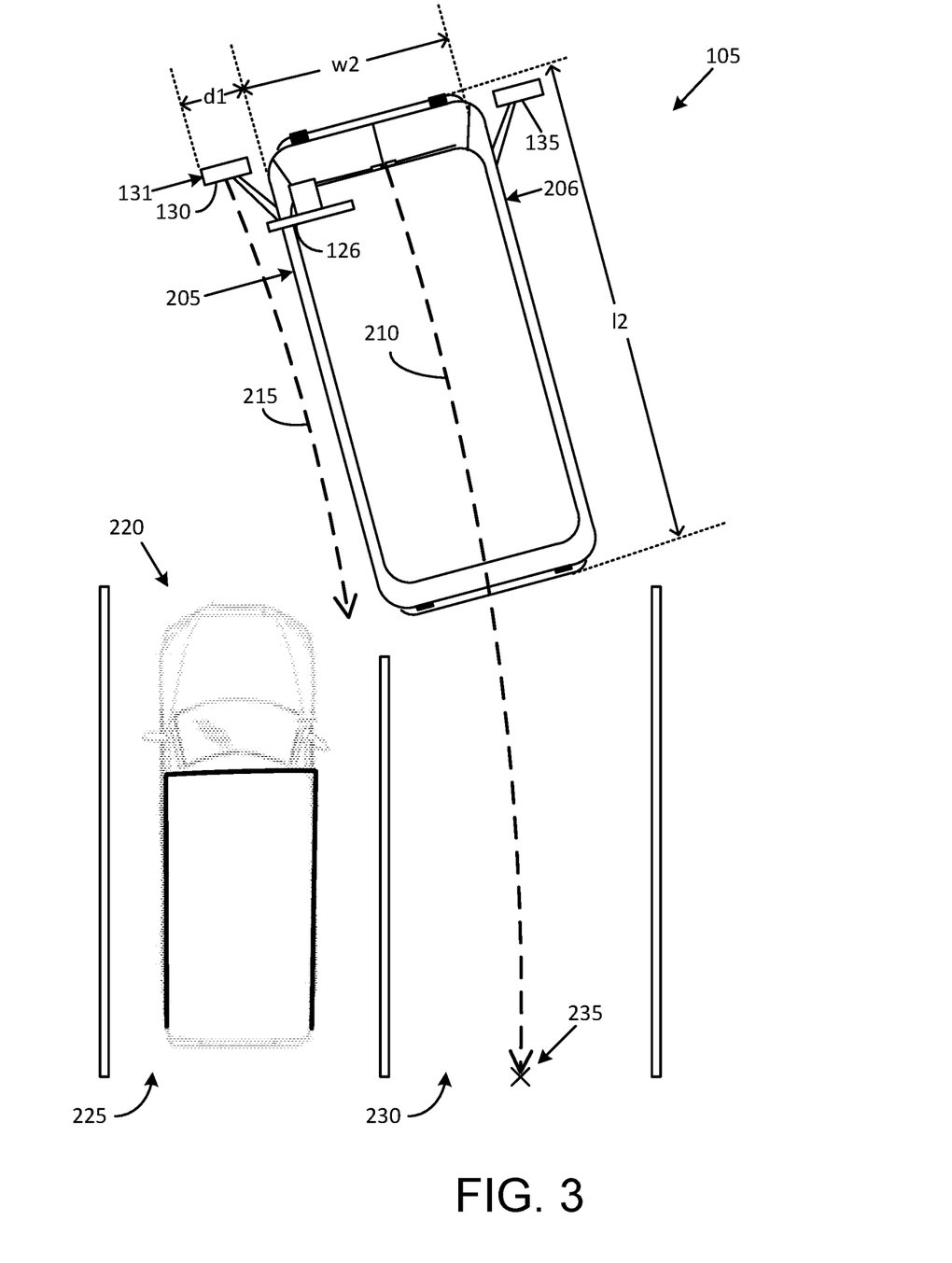
FIG. 3 illustrates a second example scenario in accordance with the disclosure where a vehicle having a protruding side-view mirror reverses into a parking spot.

FIG. 3 illustrates a second example scenario in accordance with the disclosure where the vehicle 105 reverses into the parking spot 230. In this second example scenario, the vehicle 105 has a width "w2" that is less than the width "w1" and a length "12" that is less than the length "11." The outside edge 131 of the side-view mirror 130 extends over the same protrusion distance "d1." The turning path characteristic of the vehicle 105 (as defined by the arcuate motion path 210) is identical to the one described above. The side-view mirror 130 follows the arcuate motion path 215 that runs parallel to the arcuate motion path 210.

In this scenario, the first dimensional parameter associated with the body portion of the vehicle 105 can be, for example, the width "w2" of the vehicle 105 and/or the length "12" of the vehicle 105. The second dimensional parameter associated with the side-view mirror 130 can be, for example, the protrusion distance "d1" with respect to the driver side 205 of the vehicle 105. The arcuate motion path 210 is identical to that described above.

The probability of the collision in this second example scenario is lower than the probability of the collision in the first example scenario described above as a result of the difference in the first dimensional parameter between the two scenarios (specifically, a reduction in the width of the vehicle 105 ("w2"<"w1") and a reduction in length of the vehicle 105 ("12"<"11").

Figure 4:
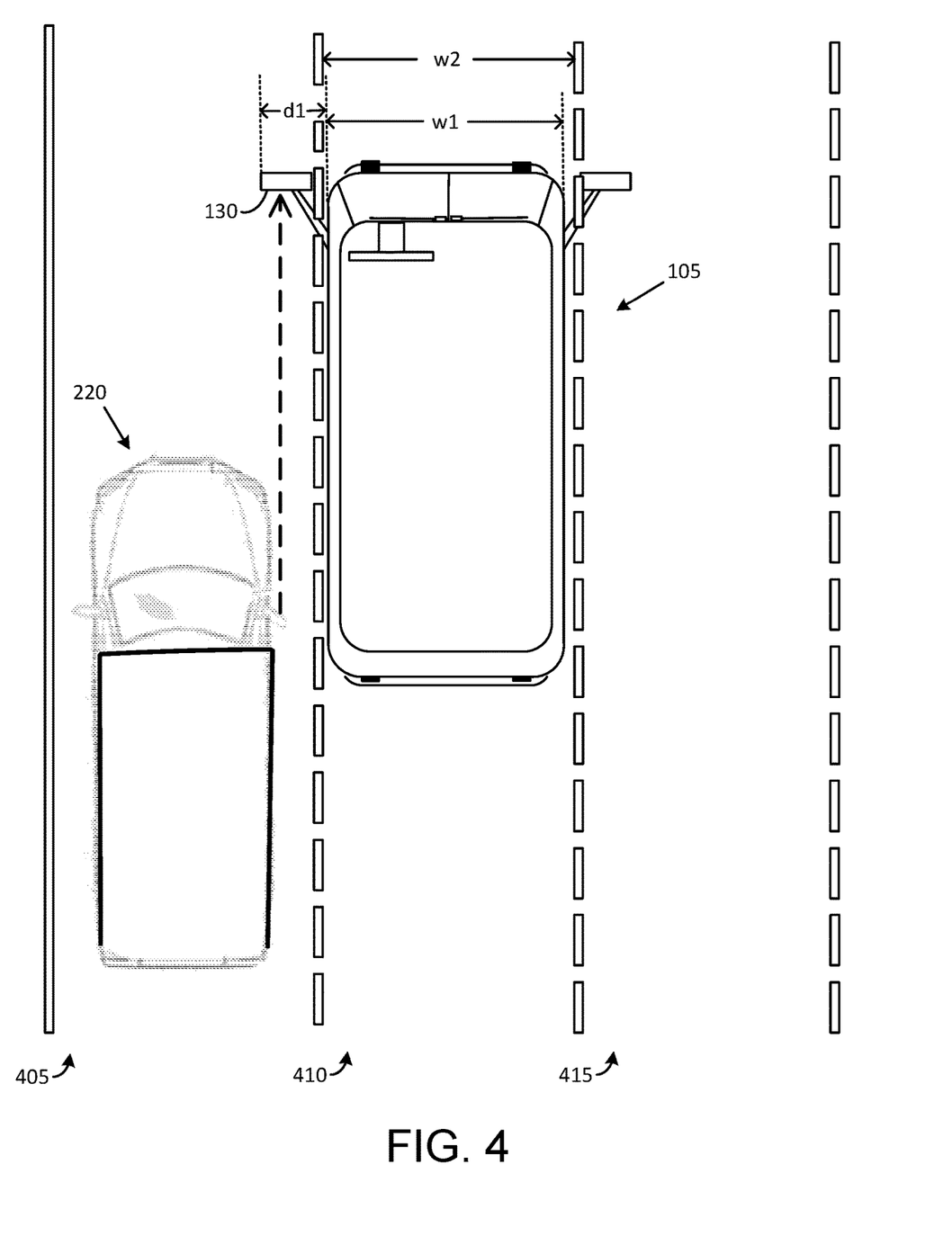
FIG. 4 illustrates a third example scenario in accordance with the disclosure where a vehicle having a protruding side-view mirror is traveling on a multi-lane highway.

FIG. 4 illustrates a third example scenario in accordance with the disclosure where the vehicle 105 is traveling on a multi-lane highway. In this scenario, the width of the vehicle 105 is "w1" and the side-view mirror 130 extends over the protrusion distance "d1" with respect to the driver side 205 of the vehicle 105. The multi-lane highway includes a lane 410 in which the vehicle 105 is moving. More particularly, the vehicle 105 is moving ahead of the vehicle 220 that is moving in lane 405 that is adjacent to the lane 410.

A width ("w2") of the lane 410 is slightly greater than the width "w1" of the vehicle 105, but less than a combination of the width "w1" of the vehicle 105 and the protrusion distance "d1" of the side-view mirror 130 (i.e., w2<(w1+ d1)). Consequently, the side-view mirror 130 protrudes into the adjacent lane 405 and exposes the side-view mirror 130 to a risk of damage as a result of contact between the side-view mirror 130 and a portion of the vehicle 220 that is moving in the adjacent lane 405.

In an example scenario, the side-view mirror protection system 115 may evaluate sensor signals (and/or images) and issue an alert. The driver 125 of the vehicle 105 may respond to the alert by switching lanes and moving to a lane 415 so as to increase a lateral separation distance between the vehicle 105 and the vehicle 220.

In another example scenario, the side-view mirror protection system 115 may execute a preventive maneuver such as, for example, cooperating with the vehicle computer 110 to automatically guide the vehicle into the lane 415 (with or without assistance from the driver 125). The preventive maneuver is particularly relevant when the vehicle 105 is an autonomous vehicle.

In yet another example scenario, the side-view mirror protection system 115 may obtain a height information of the side-view mirror 210 with respect to ground. The height information may be obtained, for example, via wireless communications with the server computer 145, or via data stored in a database of the side-view mirror protection system 115.

The side-view mirror protection system 115 may then determine a probability of the side-view mirror 210 coming in contact with a portion of the vehicle 220 based on evaluating an image of the vehicle 220 (captured by a camera of the sensor system 140) and comparing a height of the vehicle 220 to the height of the side-view mirror 210. Thus, in an example situation, the side-view mirror protection system 115 may conclude that the probability of collision between the side-view mirror 130 and a portion of the vehicle 220 is negligible (zero, for example) in view of the height of the side-view mirror 210 of the vehicle 105 (a semi-tractor trailer, for example) with respect to a roof of the vehicle 220 (a sedan, for example).

Figure 5:
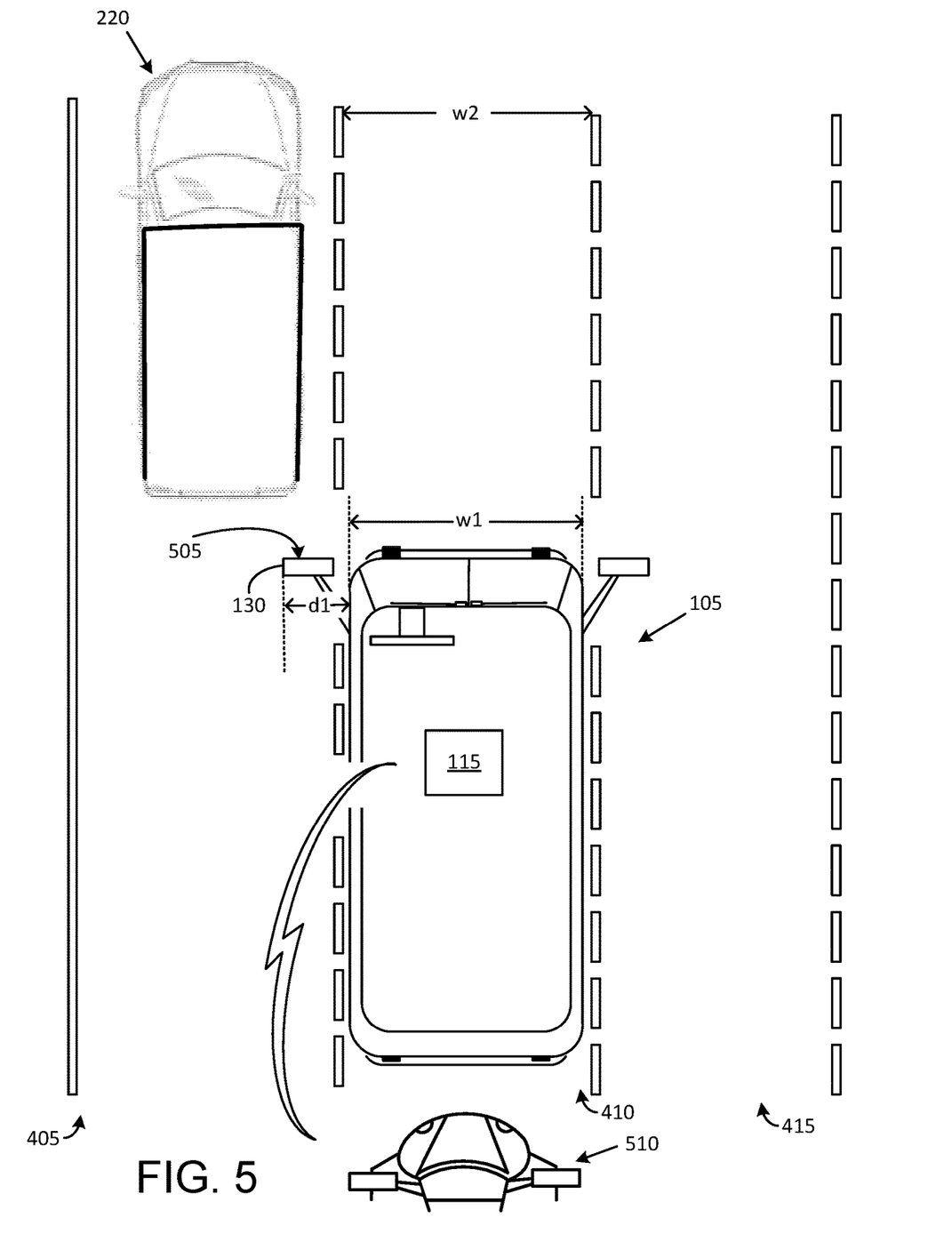
FIG. 5 illustrates a fourth example scenario in accordance with the disclosure where a vehicle having a protruding side-view mirror is traveling on a multi-lane highway.

FIG. 5 illustrates a fourth example scenario in accordance with the disclosure where the vehicle 105 that includes the side-view mirror 130 is traveling on a multi-lane highway. The fourth example scenario is similar to the third example scenario described above with respect to the dimensions "w1," "w2," and "d1." In this scenario, the vehicle 105 is traveling in the lane 410 behind the vehicle 220 that is traveling in lane 405. The side-view mirror protection system 115 evaluates sensor signals and/or images to determine a probability of a collision between the side-view mirror 130 and a portion of the vehicle 220 (a rear-end portion, for example). Evaluation of the sensor signals and/or images can include determining a separation distance between a non-reflecting surface 505 of the side-view mirror 130 and the portion of the vehicle 220 and can further include determining a rate of reduction of the separation distance between the non-reflecting surface 505 of the side-view mirror 130 and the portion of the vehicle 220. The rate of reduction of the separation distance can be directly proportional to a difference in speeds between the vehicle 105 and the vehicle 220.

Based on the evaluation, the side-view mirror protection system 115 may either issue an alert or execute a preventive maneuver when the probability of the collision exceeds a threshold value. An example preventive maneuver executed by the side-view mirror protection system 115 may involve the side-view mirror protection system 115 cooperating with the vehicle compute 110 to automatically guide the vehicle into the lane 415 (with or without assistance from the driver 125) and/or reducing a speed of the vehicle 105.

In another example scenario, the width ("w2") of the lane 410 is greater than a combination of the width "w1" of the vehicle 105 and the protrusion distance "d1" of the side-view mirror 130. Consequently, the side-view mirror 130 does not protrude into the lane 405. However, a portion of the vehicle 220 (a passenger side-view mirror, for example) may protrude into the lane 410 in which the vehicle 105 is moving. The protrusion can be due to various reasons such as, for example, due to the vehicle 220 being a wide-body vehicle or due to the vehicle 220 straddling the lane 405 and the lane 410 as a result of driver negligence.

The side-view mirror protection system 115 evaluates sensor signals and/or images to determine a probability of a collision between the side-view mirror 130 and a portion of the vehicle 220 (the passenger side-view mirror in this example) and issues an alert and/or executes a preventive maneuver (such as, for example, any of the preventive maneuvers described above) when the probability of the collision exceeds a threshold value.

Furthermore in accordance with the disclosure, the side-view mirror protection system 115 may wirelessly communicate with a vehicle 510 that is traveling behind the vehicle 105 to warn a driver of the vehicle 510 (or a computer of the vehicle 510, when the vehicle 510 is an autonomous vehicle) about a probability of collision between a portion of the vehicle 510 and the vehicle 220.

The side-view mirror protection system 115 may wirelessly communicate with the vehicle 510 either directly (using communication technologies such as, for example, vehicle-to-vehicle (V2V) communications) or indirectly (via the network 150 and/or via an infrastructure system). Communications via the infrastructure system may be carried out by use of communication technologies such as, for example, vehicle-to-infrastructure (V2I) communications.

Figure 6:
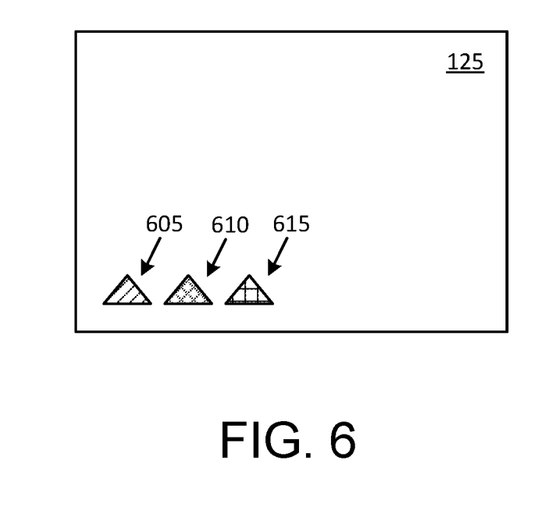
FIG. 6 illustrates a first example alert displayed on a side-view mirror of a vehicle in accordance with an embodiment of the disclosure.

FIG. 6 illustrates a first example alert displayed by the side-view mirror protection system 115 on the side-view mirror 130 of the vehicle 105 in accordance with an embodiment of the disclosure. The first example alert, which can also be displayed on a display screen of the infotainment system 120, is a graphical representation containing three graphical icons. A first graphical icon 605 is a triangle (any other shape may be used in other implementations) of a first color (green, for example). When in an illuminated state, the first graphical icon 605 conveys to the driver 125 an indication that there is no risk of the side-view mirror 130 sustaining damage due to a collision with an object outside the vehicle 105.

A second graphical icon 610 is a triangle (any other shape may be used in other implementations) of a second color (amber, for example). When in an illuminated state, the second graphical icon 610 conveys to the driver 125 an indication that there is a moderate amount of risk of the side-view mirror 130 sustaining damage due to a collision with an object outside the vehicle 105.

A third graphical icon 615 is a triangle (any other shape may be used in other implementations) of a third color (red, for example). When in an illuminated state, the third graphical icon 615 conveys to the driver 125 an indication that there is an imminent risk of the side-view mirror 130 sustaining damage due to a collision with an object outside the vehicle 105. In some applications, the side-view mirror protection system 115 may cause the third graphical icon 615 to flash in order to draw the attention of the driver 125. The side-view mirror protection system 115 may concurrently issue an audible warning to alert the driver 125 of the risk of damage to the side-view mirror 130.

Figure 7:
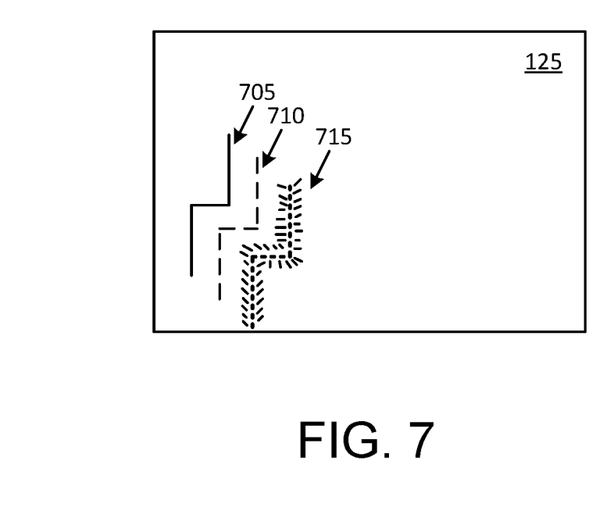
FIG. 7 illustrates a second example alert displayed on a side-view mirror of a vehicle in accordance with an embodiment of the disclosure.

FIG. 7 illustrates a second example alert displayed by the side-view mirror protection system 115 on the side-view mirror 130 of the vehicle 105 in accordance with an embodiment of the disclosure. The second example alert, which can also be displayed on a display screen of the infotainment system 120, is a graphical representation containing three graphical icons.

A first graphical icon 705 is a multi-segment line (a single straight line or a curved line may be used in other implementations) of a first color (green, for example). When in an illuminated state, the first graphical icon 605 conveys to the driver 125 an indication that there is no risk of the side-view mirror 130 sustaining damage due to a collision with an object outside the vehicle 105.

A second graphical icon 710 is a multi-segment line (a single straight line or a curved line may be used in other implementations) of a second color (amber, for example). When in an illuminated state, the second graphical icon 610 conveys to the driver 125 an indication that there is a moderate amount of risk of the side-view mirror 130 sustaining damage due to a collision with an object outside the vehicle 105.

A third graphical icon 615 is a multi-segment line (a single straight line or a curved line may be used in other implementations) of a third color (red, for example). When in an illuminated state, the third graphical icon 615 conveys to the driver 125 an indication that there is an imminent risk of the side-view mirror 130 sustaining damage due to a collision with an object outside the vehicle 105.

In some applications, the side-view mirror protection system 115 may cause the third graphical icon 615 to flash in order to draw the attention of the driver 125. The side-view mirror protection system 115 may concurrently issue an audible warning to alert the driver 125 of the risk of damage to the side-view mirror 130.

Each of the three multi-segment lines may also be arranged to provide an indication of a separation distance between the side-view mirror 130 and an object located outside the vehicle 105 that may collide with the side-view mirror 130. For example, a horizontal segment of the first graphical icon 705 is located higher up on the side-view mirror 130 than a horizontal segment of the third graphical icon 715, thereby indicating that the object is closer to the side-view mirror 130 when the third graphical icon 715 is illuminated. In some implementations, an additional graphical icon (not shown) representing the object (a vehicle, for example) may be displayed below the third graphical icon 715.

Figure 8:
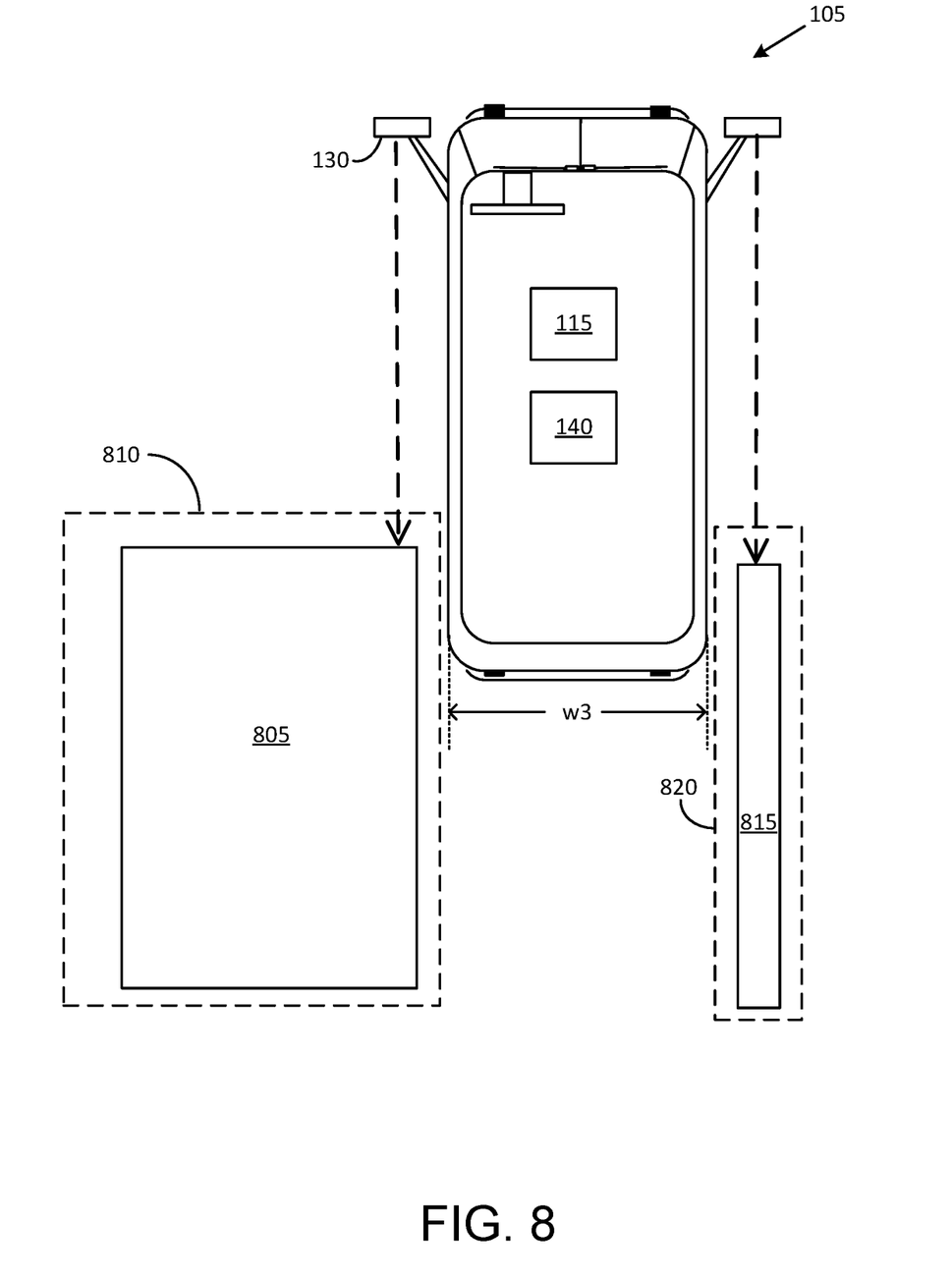
FIG. 8 illustrates an example geofence that may be provided around an object for preventing damage to a side-view mirror of a vehicle in accordance with the disclosure.

FIG. 8 illustrates a first example geofence 810 that may be provided around an object 805 for preventing damage to the side-view mirror 130 of the vehicle 105 in accordance with the disclosure. The object 805 can be any stationary object such as, for example, a part of a building structure (a garage, a room, etc.), a wall, a pillar, a garden ornament, a mailbox, or a fence. In the illustrated example scenario, the vehicle 105 has a width "w3" that is adequate to park the vehicle 105 in a parking spot located between the object 805 and a wall 815. However, doing so can cause damage to the side-view mirror 130 as a result of a collision with the object 805.

Accordingly, in accordance with the disclosure, the side-view mirror protection system 115 may determine a probability of a collision between the side-view mirror 130 and the object 805 based on evaluating sensor signals and/or images provided to the side-view mirror protection system 115 by the sensor system 140.

In the illustrated scenario, the probability of collision exceeds a threshold value and the side-view mirror protection system 115 executes a geofence installation procedure that involves defining a geofence 810 around at least a portion of the object 805. The geofence 810 offers protection to the side-view mirror 130 at multiple occasions such as, for example, when the vehicle 105 is parked every evening over a period of time (days, months, etc.).

In an example operation, the side-view mirror protection system 115 detects the geofence 810 when the vehicle 105 is being reversed into the parking spot between the object 805 and the wall 815. Upon detecting the geofence 810, the side-view mirror protection system 115 may provide an alert (such as in the form of illuminating the graphical icons provided on the side-view mirror 130) to assist the driver 125 and prevent damage to the side-view mirror 130. A geofence 820 may be similarly provided around at least a portion of the wall 815 and used to protect the side-view mirror 135.

Figure 9:
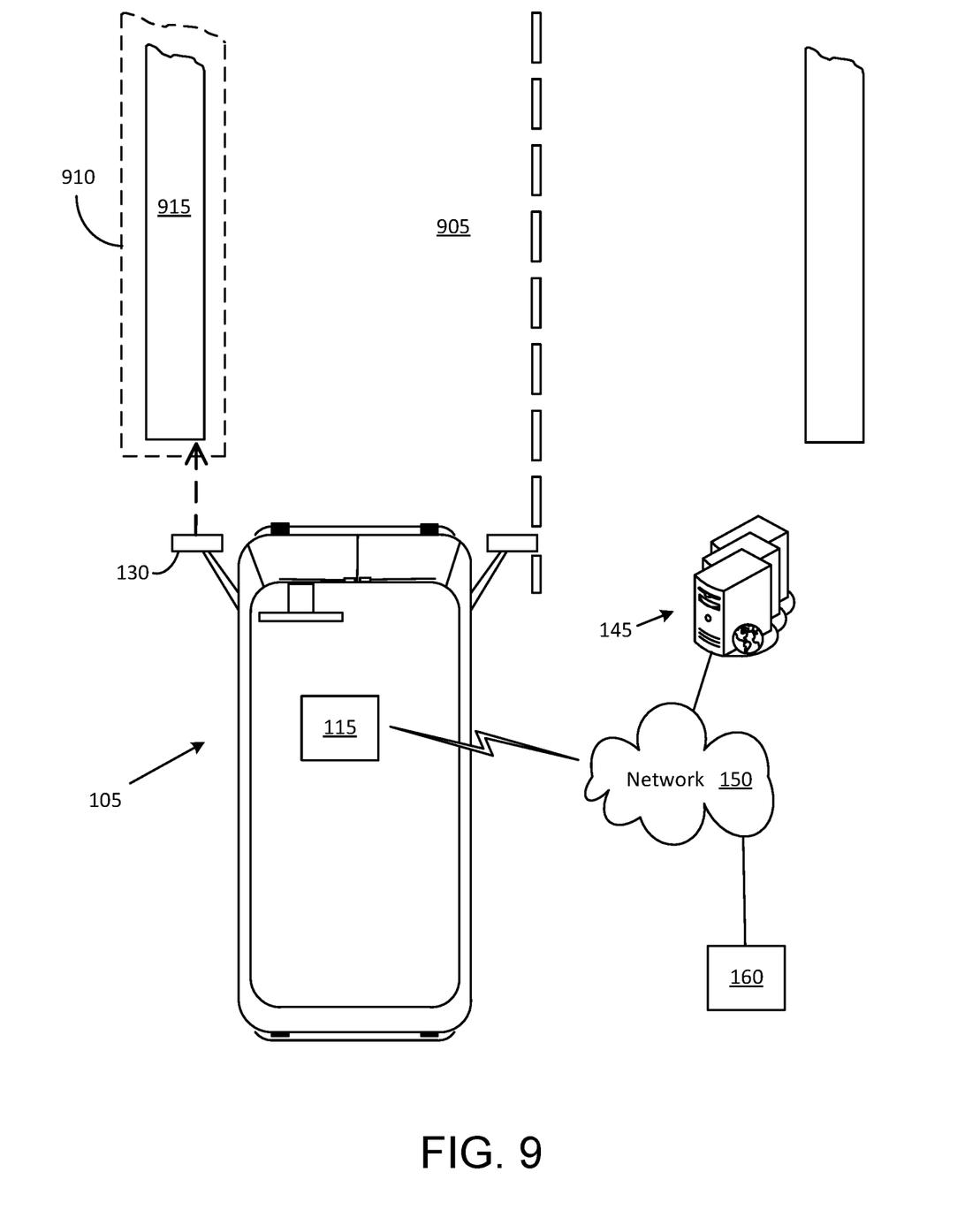
FIG. 9 illustrates an example geofence that may be provided around an object for preventing damage to a side-view mirror of a vehicle in accordance with the disclosure.

FIG. 9 illustrates a second example geofence 910 that may be provided for preventing damage to side-view mirrors of one or more other vehicles in accordance with the disclosure. The geofence 910 may be provided around an object that is accessible to the general public such as, for example, a tunnel 905 that accommodates passage of various types of vehicles. Some of these vehicles may include side-view mirrors that are susceptible to damage as a result of contact with one or more walls of the tunnel 905.

In the illustrated scenario, the side-view mirror protection system 115 may determine a probability of a collision between the side-view mirror 130 and a wall 915 of the tunnel 905 based on evaluating sensor signals and/or images provided to the side-view mirror protection system 115 by the sensor system 140. The side-view mirror protection system 115 may execute a geofence installation procedure when the probability of collision exceeds a threshold value. The geofence 910 may, for example, be defined with respect to the wall 915 of the tunnel 905. Information pertaining to the geofence 910 may then be propagated by the side-view mirror protection system 115 to the server computer 145 and made available for use by other vehicles that may subsequently follow the vehicle 105 into the tunnel 905.

Figure 10:
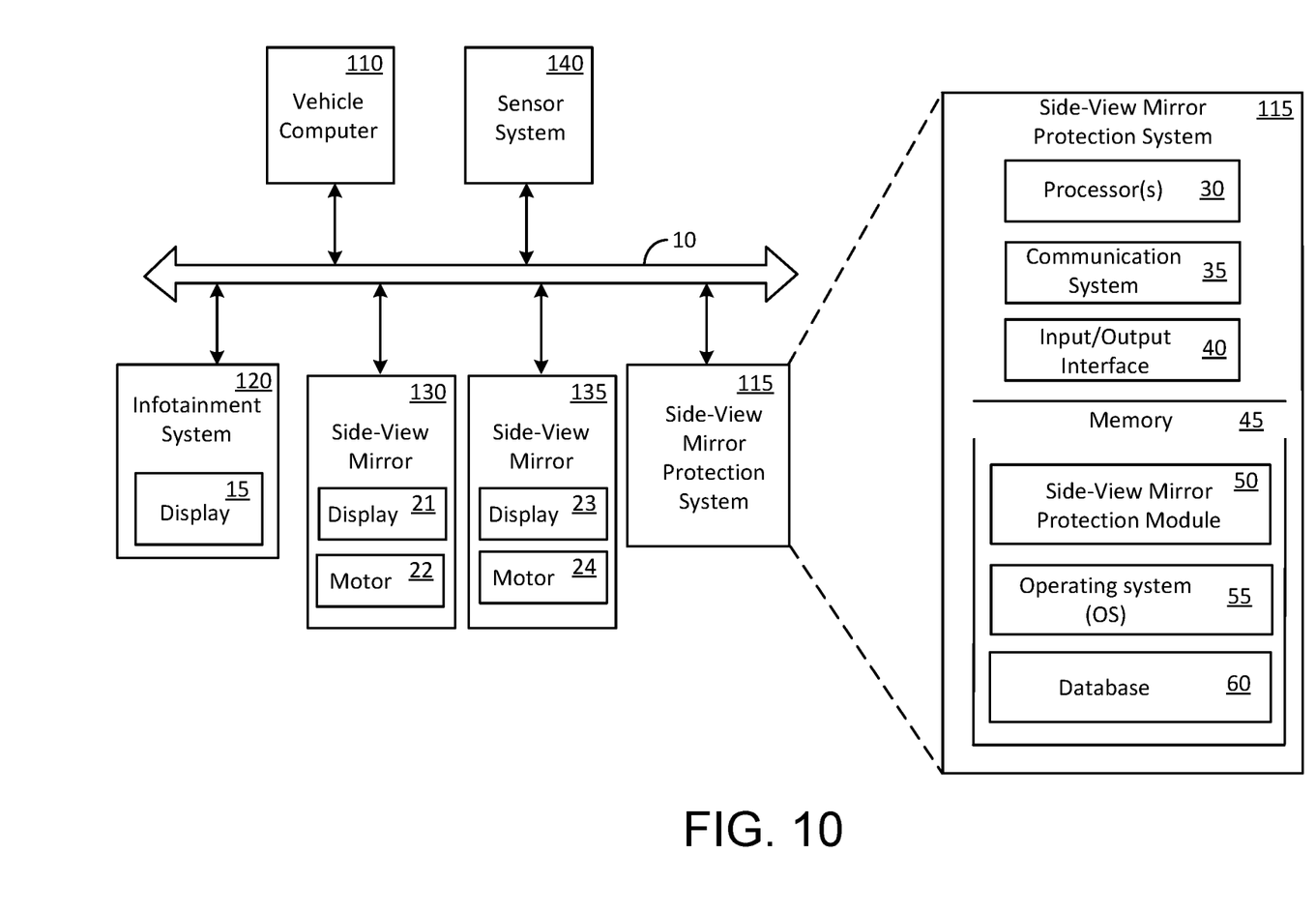
FIG. 10 shows some example components that may be provided in a vehicle in accordance with disclosure.

FIG. 10 shows some example components that may be provided in the vehicle 105 in accordance with disclosure. The example components may include the vehicle computer 110, the sensor system 140, the infotainment system 120, the side-view mirror 130, the side-view mirror 135, and the side-view mirror protection system 115.

The various components are communicatively coupled to each other via one or more buses, such as a bus 10 that can be implemented using various wired and/or wireless technologies. For example, the bus 10 can be a vehicle bus that uses a controller area network (CAN) bus protocol, a Media Oriented Systems Transport (MOST) bus protocol, and/or a CAN flexible data (CAN-FD) bus protocol. Some or all portions of the bus 10 may also be implemented using wireless technologies such as Bluetooth®, Ultra-Wideband, Wi-Fi, Zigbee®, or near-field-communications (NFC).

The vehicle computer 110 and the sensor system 140 have been described above. The infotainment system 120 includes a display 15 on which a GUI or HMI can be displayed for use by the driver 125 to communicate with the side-view mirror protection system 115. The display 15 may also be used by the side-view mirror protection system 115 for displaying alerts such as the alerts described above.

The side-view mirror 130 can include a display 21 that may be used by the side-view mirror protection system 115 for displaying alerts such as the alerts described above. The side-view mirror 130 can also include a motor 22 that can be actuated via a command issued by the side-view mirror protection system 115. The motor 22 may be actuated for folding the side-view mirror 130 inwards and/or for moving a longitudinal member of a mount upon which the side-view mirror 130 is mounted. The longitudinal member may be moved in order to reduce the length of a protrusion of the side-view mirror 130 with respect to the driver side 205 of the vehicle 105 (shown in FIG. 2).

The side-view mirror 135 can include a display 23 and a motor 24 similar to the display 23 and the motor 22 described above.

The side-view mirror protection system 115 can include a processor 30, a communication system 35, an input/output interface 40, and a memory 45. In some implementations, some, or all of the functionalities of these components can be incorporated into the vehicle computer 110.

The communication system 35, which can include various devices such as, for example, a WiFi transceiver and/or a cellular communication system, is configured to allow the side-view mirror protection system 115 to communicate via the network 150 with devices such as, for example, the server computer 145 and the cloud storage device 160. The communication system 35 can further include various devices such as, for example, a Bluetooth® transceiver, a UWB transceiver, a Zigbee® transceiver, and/or an NFC transceiver. communication The input/output interface 40 is configured to receive sensor signals from the sensor system 140 (either via the bus 10 or wirelessly via Bluetooth® for example) and to transmit signals to components such as the infotainment system 120 (the display 15), the side-view mirror 130 (display 21, motor 22) and the side-view mirror 135 (display 23, motor 24).

The memory 45, which is one example of a non-transitory computer-readable medium, may be used to store an operating system (OS) 55, a database 60, and various code modules such as a side-view mirror protection module 50. The code modules are provided in the form of computer-executable instructions that can be executed by the processor 30 for performing various operations in accordance with the disclosure. For example, the side-view mirror protection module 50 can be executed by the processor 30 for performing various operations in accordance with the disclosure. The operations are generally directed at protecting the side-view mirror 130 and the side-view mirror 135 from damage due to collision with an object located outside the vehicle 105.

In an exemplary implementation, the side-view mirror protection module 50 is a software application that is downloaded into the side-view mirror protection system 115 and automatically activated each time the vehicle 105 is started. As a part of the operations, the side-view mirror protection module 50 may access data stored in the database 60, a database of the server computer 145, and/or the cloud storage device 160. The data can include various types of information about the vehicle 105 (such as, for example, various dimensions of the vehicle 105, one or more threshold values, and alert message formats).

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," or "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, such as the processor 205, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device such as the memory 45, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not in function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
   obtaining, by a processor, a first dimensional parameter associated with a body portion of a vehicle;
   obtaining, by the processor, a second dimensional parameter associated with a side-view mirror attached to the vehicle;
   determining, by the processor, a turning path characteristic associated with a movement of the vehicle;
   determining, by the processor, a probability of a collision between the side-view mirror and an object located outside the vehicle, based on the first dimensional parameter, the second dimensional parameter, and the turning path characteristic;
   determining, by the processor, that the probability of the collision exceeds a threshold value; and
   executing, by the vehicle, a preventive maneuver to prevent the collision based on determining that the probability of the collision exceeds the threshold value.

2. The method of claim 1, wherein the first dimensional parameter is one of a width of the vehicle as measured along a transverse axis of the vehicle or a length of the vehicle as measured along a longitudinal axis of the vehicle.

3. The method of claim 2, wherein the turning path characteristic comprises an arcuate motion path that causes the probability of the collision to exceed the threshold value.

4. The method of claim 3, wherein determining the probability of the collision between the side-view mirror and the object located outside the vehicle is based on a radius of the arcuate motion path and the first dimensional parameter.

5. The method of claim 4, wherein the second dimensional parameter is a protrusion distance of the side-view mirror with respect to a side of the vehicle and wherein determining the probability of the collision between the side-view mirror and the object located outside the vehicle is further based on the protrusion distance.

6. The method of claim 4, wherein the processor is a part of a side-view mirror protection system provided in the vehicle and wherein the first dimensional parameter and/or the second dimensional parameter is obtained from a server computer that is communicatively coupled to the side-view mirror protection system.

7. A method comprising:
   obtaining, by a processor, a first dimensional parameter associated with a mounting of a side-view mirror upon a body portion of a first vehicle;
   detecting, by the processor, an object located outside the first vehicle;
   determining, by the processor, a probability of a collision between the side-view mirror and the object, based on at least the first dimensional parameter;
   determining, by the processor, that the probability of the collision exceeds a threshold value; and
   executing, by the first vehicle, a preventive maneuver to prevent the collision between the side-view mirror and the object, based on the probability of the collision exceeding the threshold value.

8. The method of claim 7, wherein the first dimensional parameter associated with the mounting of the side-view mirror upon the body portion of the first vehicle is a protrusion distance of the side-view mirror with respect to a side of the first vehicle.

9. The method of claim 8, further comprising:
   obtaining, by the processor, a second dimensional parameter associated with the body portion of a vehicle;
   determining, by the processor, a turning path characteristic associated with a movement of the first vehicle; and
   determining, by the processor, the probability of the collision between the side-view mirror and the object located outside the first vehicle, based on the second dimensional parameter, the protrusion distance of the side-view mirror, and the turning path characteristic.

10. The method of claim 9, further comprising issuing an alert comprising displaying one of a graphical icon upon the side-view mirror or a flashing light.

11. The method of claim 10, wherein the graphical icon comprises a first symbol that is a first representation of a first level of probability of the collision between the side-view mirror and the object and a second symbol that provides a second representation of a second level of probability of the collision between the side-view mirror and the object.

12. The method of claim 9, wherein executing the preventive maneuver to prevent the collision between the side-view mirror and the object comprises at least one of an automatic braking operation, an automatic modification of the turning path characteristic, or a folding action executed upon the side-view mirror.

13. The method of claim 9, further comprising:
   defining, by the processor, a geofence encompassing the object; and
   conveying, by the processor, to a server computer, information about the geofence.

14. The method of claim 9, further comprising:
conveying, by the processor, to a second vehicle, information about the object.

15. A system comprising:
a side-view mirror protection system comprising:
a memory that stores computer-executable instructions; and
a processor configured to access the memory and execute the computer-executable instructions to at least:
obtaining a first dimensional parameter associated with a body portion of a first vehicle;
obtaining a second dimensional parameter associated with a side-view mirror attached to the first vehicle;
determining a turning path characteristic associated with a movement of the first vehicle;
determining a probability of a collision between the side-view mirror and an object located outside the first vehicle, based on the first dimensional parameter, the second dimensional parameter, and the turning path characteristic;
determining that the probability of the collision exceeds a threshold value; and
executing a preventive maneuver to prevent the collision based on determining that the probability of the collision exceeds the threshold value.

16. The system of claim 15, further comprising:
a server computer communicatively coupled to the side-view mirror protection system, the server computer configured to provide to the side-view mirror protection system, the first dimensional parameter and the second dimensional parameter; and
a sensor located in the first vehicle, the sensor configured to provide to the side-view mirror protection system, data associated with the turning path characteristic.

17. The system of claim 16, further comprising:
a vehicle computer communicatively coupled to the side-view mirror protection system, the vehicle computer configured to receive a command from the side-view mirror protection system and respond to the command by executing one of an automatic braking operation, an automatic modification of the turning path characteristic, or a folding action executed upon the side-view mirror.

18. The system of claim 17, further comprising:
a warning system comprising:
a display configured to display a graphical icon upon the side-view mirror, the graphical icon comprising a first symbol that is a first representation of a first level of probability of the collision between the side-view mirror and the object and a second symbol that provides a second representation of a second level of probability of the collision between the side-view mirror and the object.

19. The system of claim 17, wherein the processor is configured to access the memory and execute additional computer-executable instructions to perform additional operations comprising:
defining a geofence encompassing the object; and
conveying to the server computer, information about the geofence.

20. The system of claim 19, wherein the object is part of a building or a second vehicle.

* * * * *